Sept. 23, 1969  S. SHWARTZBERG  3,468,183
STEERING COLUMN FOR MOTOR VEHICLE
Filed Nov. 7, 1967
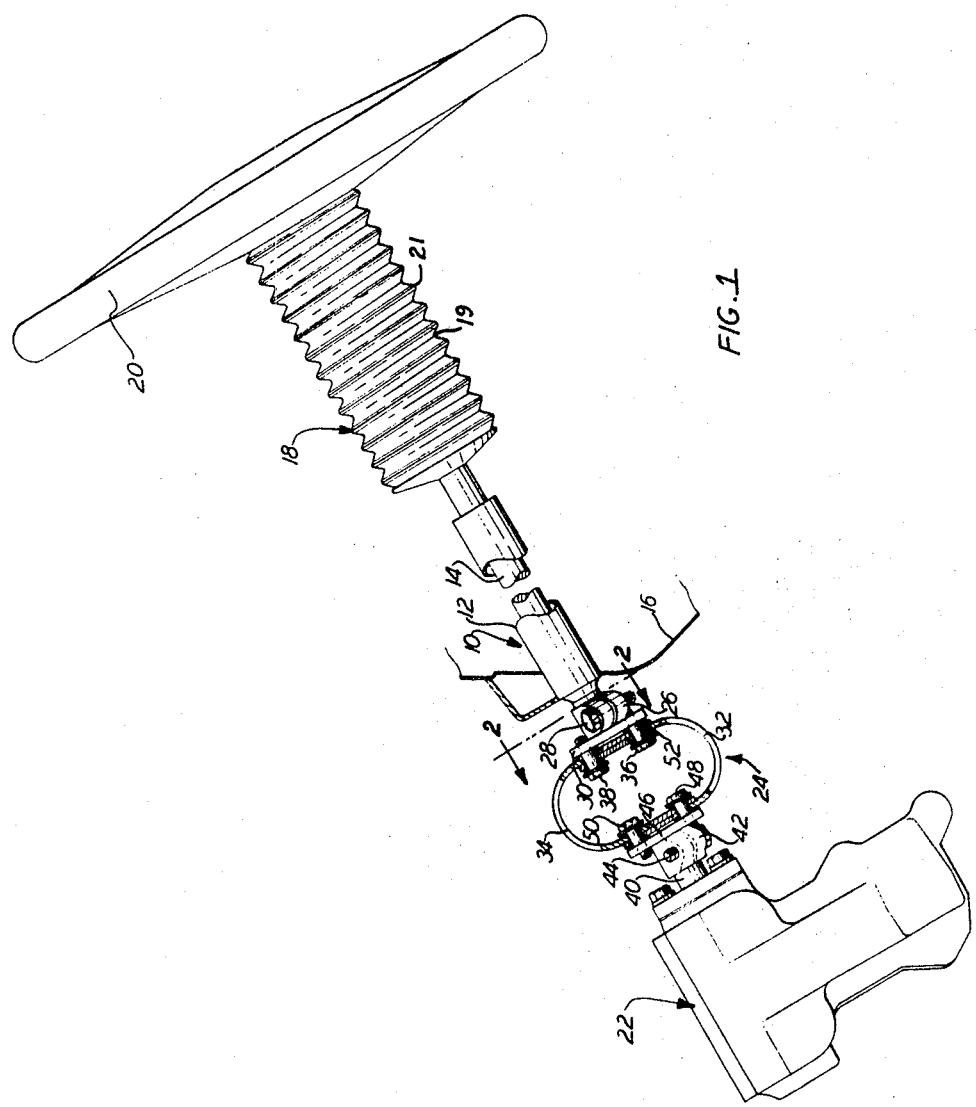
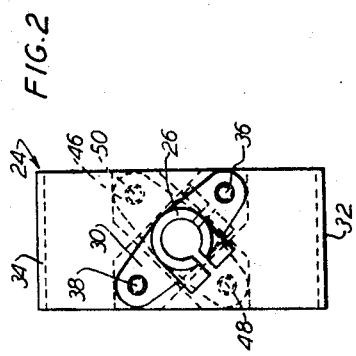
SHALOM SHWARTZBERG
INVENTOR
BY *John R. Faulkner*
*Clifford L. Sadler*
ATTORNEYS United States Patent Office 3,468,183
Patented Sept. 23, 1969

3,468,183
STEERING COLUMN FOR MOTOR VEHICLE
Shalom Shwartzberg, Ilford, Essex, England, assignor to Ford Motor Company, Dearborn, Mich., a corporation of Delaware
Filed Nov. 7, 1967, Ser. No. 681,262
Claims priority, application Great Britain, Mar. 3, 1967, 10,132/67
Int. Cl. B62b 1/18
U.S. Cl. 74—492          7 Claims

ABSTRACT OF THE DISCLOSURE

An energy absorbing steering column for a motor vehicle having a collapsible connector at the lower end of the steering shaft to permit the steering gear to be displaced rearwardly without displacing the steering shaft rearwardly. In the preferred embodiment of the invention, the connector is formed of a pair of U-shaped yieldable metal strips that join the shaft to the gear.

BACKGROUND OF THE INVENTION

The present invention is particularly concerned with providing an energy absorbing structure that will prevent the steering shaft from being displaced rearwardly from its conventional position in the event that the steering gear is moved rearwardly.

BRIEF SUMMARY OF THE INVENTION

According to the presently preferred embodiment of this invention, a steering column assembly has a steering shaft that is connected to the steering gear by a unique structure. This structure comprises a pair of U-shape metal bands that are bent and joined together to form a continuous loop which is interposed between the lower end of the steering shaft and the input shaft of the steering gear. This loop is adapted to collapse axially under a force above a predetermined value whereby the steering gear is permitted to move rearwardly without moving the steering shaft.

BRIEF DESCRIPTION OF THE DRAWINGS

The many objects and advantages of the present invention will become apparent upon consideration of the following detailed description and the accompanying drawings, in which:

FIGURE 1 is a side elevational view of a steering column construction in accordance with this invention; and FIGURE 2 is a sectional view taken along section lines 2—2 of FIGURE 1.

DETAILED DESCRIPTION OF THE INVENTION

Refering now to the drawings for a detailed description of the invention, FIGURE 1 illustrates a steering column assembly, steering gear and interconnecting structure constructed in accordance with the presently preferred embodiment of this invention.

The starting column 10 comprises an outer stationary tubular member 12 that rotatably supports a steering shaft 14. The tube 12 is supported at its lower end by the fire wall 16 of the vehicle. The upper end of the tube 12 is supported by a bracket connected to the instrument panel (not shown). The upper end of the steering shaft 14 is connected to a collapsible member 18 and the upper end of the member 18 is, in turn, connected to the steering wheel 20. The collapsible member 18 is formed in the manner of a corrugated can having axially spaced apart annular grooves 19 and ridges 21.

A steering gear 22 is situated generally in the engine compartment of the vehicle and is connected to the steering shaft 14 by means of the connecting structure 24. The output of gear 22 is connected to the vehicle steering linkage.

A clamp 26 is secured to the lower end of the steering shaft 14 by a pinch bolt 28. A plate 30 is welded to the clamp 26 and provides a means for attachment to a pair of U-shape sheet metal members 32 and 34. As noted in FIGURES 1 and 2, the leg portions of the members 32 and 34 overlap so that bolts 36 and 38 may pass through appropriate holes therein for attachment to the plate 30.

The steering gear 22 has an input shaft 40 to which a clamp 42 is secured by a pinch bolt 44. This structure is similar to that illustrated at the lower end of the steering shaft 14 and includes a plate 46 for attachment of the adjacent legs of U-shape members 32 and 34. Bolts 48 and 50 pass through the legs of the members 34, 32 and engage the plate 36.

It will be noted from the drawing that rubber grommets 52 surround the bolts 36, 38, 48 and 50 and engage the respective legs of the U-shape sheet metal members 32, 34. The grommets provide some flexibility in the connection that will accommodate minor misalignment between the shaft 40 of the gear 22 and the steering shaft 14. In addition, the grommets 52 isolate noise and vibration occurring in the steering gear 22 from the steering wheel 20.

OPERATION

Under normal conditions, the joint 24 maintains the shape illustrated. In the event the steering gear 22 is forced rearwardly toward the fire wall 16, however, the connection 24 will collapse axially to allow the gear 22 to move toward the shaft 14 without forcing the shaft 14 and steering wheel 20 rearwardly. The connection 24 is permanently deformed by this collapse and thereby absorbs energy. The construction of the connection 24 also acts to isolate noise and vibration occurring in the steering gear 22 and engine compartment from being transmitted into the passenger compartment by means of the steering column 14.

The foregoing description presents the presently preferred embodiment of this invention. Modifications and alterations may occur to those skilled in the art that will come within the scope and spirit of the invention.

I claim:
1. A steering mechanism for a motor vehicle having steering column assembly comprising a tubular stationary support structure and a steering shaft rotatably supported in said support structure, a steering wheel, first means interconnecting one end of said steering shaft and said steering wheel, a steering gear constructed to be connected to the steerable road wheels of said motor vehicle, second means interconnecting said steering shaft and said steering gear and constructed to provide a driving connection therebetween, said second means comprising at least one U-shaped sheet metal member having spaced apart leg portions operatively connected to said gear and to said shaft, said sheet metal member being constructed to collapse and plastically deform when said gear is displaced axially toward said shaft whereby energy is absorbed.

2. A steering mechanism for a motor vehicle as defined in claim 1 and including:
said second means comprising a pair of U-shaped sheet metal members, said members having overlapping leg portions.

3. A steering mechanism for a motor vehicle as defined in claim 1 and including:
said second means comprising a pair of U-shaped sheet metal members, said members having overlapping leg portions, resilient vibrations isolating means operatively connecting said leg portions to said steering shaft and to said steering gear.

4. A steering mechanism for a motor vehicle as defined in claim 1 and including:
said first means comprising an energy absorbing device having one end connected to the upper end of said steering shaft and its other end to said steering wheel.

5. A steering mechanism for a motor vehicle as defined in claim 4 and including:
said second means comprising a pair of U-shaped sheet metal members, said members having overlapping leg portions, vibrations isolating means operatively connecting said leg portions to said steering shaft and to said steering gear.

6. A steering mechanism for a motor vehicle as defined in claim 1 and including:
said first means comprising a corrugated can having one end connected to the upper end of said steering shaft, said steering wheel being connected to the other end of said can, said can having an axially spaced apart series of ridges and grooves, said ridges having the same outside diameter.

7. A steering mechanism for a motor vehicle as defined in claim 6 and including:
said second means comprising a pair of U-shaped sheet metal members, said members having overlapping leg portions, resilient vibrations isolating means connecting said leg portions to said steering shaft and to said steering gear.

References Cited

UNITED STATES PATENTS

| 2,660,901 | 12/1953 | Latzen | 74—470 |
| 2,903,867 | 9/1959 | Moody | 64—15 |
| 3,167,974 | 2/1965 | Wilfert | 74—492 X |
| 3,262,332 | 7/1966 | Wight | 74—493 |

MILTON KAUFMAN, Primary Examiner

U.S. Cl. X.R.

64—15